United States Patent
Chiu (10) Patent No.: US 9,262,690 B2
(45) Date of Patent: Feb. 16, 2016

(54) METHOD AND DEVICE FOR DETECTING GLARE PIXELS OF IMAGE

(71) Applicant: HTC Corporation, Taoyuan County (TW)

(72) Inventor: Chia-Wei Chiu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 26 days.

(21) Appl. No.: 14/010,561

(22) Filed: Aug. 27, 2013

(65) Prior Publication Data

US 2015/0063690 A1 Mar. 5, 2015

(51) Int. Cl.
G06K 9/00 (2006.01)
G06K 9/46 (2006.01)
G06T 5/00 (2006.01)
G06T 7/40 (2006.01)

(52) U.S. Cl.
CPC ............ *G06K 9/4652* (2013.01); *G06K 9/46* (2013.01); *G06T 5/005* (2013.01); *G06T 7/408* (2013.01); *G06T 2207/20076* (2013.01); *G06T 2207/30201* (2013.01)

(58) Field of Classification Search
CPC .............................. G06K 9/46; G06K 9/4652
See application file for complete search history.

(56) References Cited

U.S. PATENT DOCUMENTS

| 8,861,847 | B2 * | 10/2014 | Srinivasan et al. | 382/165 |
|---|---|---|---|---|
| 2004/0017938 | A1 * | 1/2004 | Cooper et al. | 382/171 |
| 2005/0025357 | A1 * | 2/2005 | Landwehr | A01M 1/026 |
| | | | | 382/170 |
| 2009/0290068 | A1 * | 11/2009 | Abe et al. | 348/649 |
| 2011/0084981 | A1 * | 4/2011 | Abe et al. | 345/590 |
| 2011/0116710 | A1 * | 5/2011 | Garg et al. | 382/165 |
| 2012/0229681 | A1 * | 9/2012 | Ansfield et al. | 348/241 |
| 2012/0294521 | A1 * | 11/2012 | Lee | G06T 7/0071 |
| | | | | 382/164 |

OTHER PUBLICATIONS

Bajcsy R., Lee S. W., Leonardis A.: Detection of diffuse and specular interface reflections and interreflections by color image segmentation. International Journal of Computer Vision 17, 3 (1996), 241-272.*

* cited by examiner

*Primary Examiner* — Bhavesh Mehta
*Assistant Examiner* — Ian Lemieux
(74) *Attorney, Agent, or Firm* — Jianq Chyun IP Office (57) ABSTRACT

The present disclosure proposes a method and an electronic device for detecting glare pixels of an image including an object and an electronic device using the same. The method includes the following steps. First, the image is processed to remove overexposed pixels from the image to generate a first image. The first image is processed to remove non-object pixels from the first image to generate an object pixel image. The glare pixels are detected from the object pixel image according to a saturation distribution threshold and an intensity distribution threshold. The present disclosure is able to adjust the saturation distribution threshold and the intensity distribution threshold dynamically and adaptively to satisfy various kinds of objects and ambient lighting conditions so as to improve the probability of successful detection and reduce the probability of false alarms on the glare pixels.

20 Claims, 6 Drawing Sheets

METHOD AND DEVICE FOR DETECTING GLARE PIXELS OF IMAGE

BACKGROUND OF THE INVENTION

1. Field of the Invention

The present disclosure generally relates to a method and a device for image processing. In particular, the present disclosure relates to a method and a device for detecting glare pixels of an image.

2. Description of Related Art

As a digital camera has become small, compact, and inexpensive, consequently, the digital camera could be embedded in handheld electronic devices such as cellular phones, smart phones, tablet computers, personal digital assistants (PDA) and so forth. The diminutive nature of such camera allows the camera to become a convenient and popular additional feature of portable consumer electronic devices. However, the portability of such electronic devices may have prevented many more sophisticated uses or structures to be included for such cameras. For example, fixed focal length lenses and small sensors would typically be used for such cameras since an optical zoom lens may be too heavy and require more physical depths than the body of the handheld electronic device would permit.

Presently, as such cameras are frequently used to take facial portraits in various events or gatherings, problems associated with light-related artifacts on the images could be unavoidable. Such artifacts may not be immediately noticeable and the impacts on the quality of an image may not be appreciated after an image is taken. A typical artifact encountered by the user may include glare. In photography, glare could be characterized as an occurrence of a harsh bright light which causes a regional overexposure on an image. Glare may occur because of reasons such as bright environment, rapid transitions to different luminance adaptation levels, a direct light source, or reflections from objects with glass or metal surfaces. One of the most common causes of glare is the light from a photographic flash. Getting the best overall exposure from the combination of available light and flash illumination may pose a significant technical challenge, especially for the camera built-in to handheld electronic devices. One of the typical solutions could be to manually retouch or to modify images by using various software applications for assistance. Unfortunately, this practice may be time intensive and cumbersome especially in the case of a large amount of images. Also, the practice may produce unsatisfactory results if the users are not skillful in the use of image retouch or modification software.

Another solution is to leverage machine learning algorithms to automatically detect an artifact on a facial portrait image. Most analyses involving image recognition and classification are statistical in nature. Images could be classified based on information extracted from datasets. Automated classification may assign image pixels to real-world objects or classes. Image classification would traditionally be based on the allocation of individual pixels to the most suitable class. A most common approach to perform classification is probabilistic classification. The algorithms of this nature such as Bayesian networks, Hidden Markov Models (HMM), neural networks, decision trees, linear discriminant analysis (LDA) use statistical inference to find the best class for a given instance. On the other hand, although such algorithms have high detection rate on the artifact, they would highly depend on training data and model parameters as well as performance resource, power and time consuming arithmetic operations, which may be impractical for relatively inexpensive and memory-limited handheld electronic devices. Accordingly, there could be a demand to develop tools to improve the probability of successful detections and to reduce the probability of false alarms while ensuring optimal performance executed by electronic devices with limited computational resources.

SUMMARY OF THE INVENTION

Accordingly, the present disclosure is directed to a method and a device for detecting glare pixels of an image by dynamically adjusting thresholds during the run-time with statistics retrieved from image pixel data to be processed.

The present disclosure is directed to a method for detecting glare pixels of an image including an object. The method may include the following steps. First, the image is processed to remove overexposed pixels from the image to generate a first image. The first image is processed to remove non-object pixels from the first image to generate an object pixel image. The glare pixels are detected from the object pixel image according to a saturation distribution threshold and an intensity distribution threshold, wherein the saturation distribution threshold and the intensity distribution threshold are dynamically adjustable non-zero integers.

In one of the exemplary embodiments, before the step of processing the image to remove the overexposed pixels from the image to generate the first image, the method may further include the following step. A RGB pixel value of each image pixel of the image in a Red-Green-Blue (RGB) color space domain is obtained, wherein each of the RGB pixel values comprises an R component value, a G component value, and a B component value.

In one of the exemplary embodiments, the step of processing the image to remove the overexposed pixels from the image to generate the first image may be included as follows. Each of the overexposed pixels may be identified from the image when any pixel of the image satisfies all of the following conditions: 1) the R component value is greater than a red threshold, 2) the G component value is greater than a green threshold, and 3) the B component value is greater than a blue threshold. Then, the overexposed pixels are removed from the image so as to generate the first image.

In one of the exemplary embodiments, each of the overexposed pixels satisfies all of the following inequalities: $R_i > 244 \times (1 \pm 10\%)$, $G_i > 244 \times (1 \pm 10\%)$, and $B_i > 231 \times (1 \pm 10\%)$, wherein $R_i$ represents the R component value of the image pixel i, $G_i$ represents the G component value of the image pixel i, and $B_i$ represents the B component value of the image pixel i.

In one of the exemplary embodiments, before the step of processing the first image to remove the non-object pixels from the first image to generate the object pixel image, the method may further include the following step. The RGB pixel value of each first image pixel of the first image is converted from the RGB color space domain to a Hue-Saturation-Intensity (HSI) color space domain so as to obtain a corresponding HSI pixel value, wherein each of the HIS pixel values comprises a H component value, a S component value, and a I component value.

In one of the exemplary embodiments, when the object is a human face, the non-object pixels are non-skin pixels, and the object pixel image is a skin pixel image, the step of processing the first image to remove the non-object pixels from the first image to generate the object pixel image may be included as follows. Each of the non-skin pixels may be first identified from the image when any pixel of the image satisfies any of the following conditions: 1) the H component value is less than a lower hue threshold, 2) the H component value is greater than an upper hue threshold, 3) the S component value is less than a lower saturation threshold, and 4) the S component value is greater than an upper saturation threshold. Then, the non-skin pixels are removed from the first image to generate the skin pixel image.

In one of the exemplary embodiments, each of the non-skin pixels satisfies any of the following inequalities: $H_j<6\times(1\pm10\%)$, $H_j>38\times(1\pm10\%)$, $S_j<26\times(1\pm10\%)$ and $S_j>218\times(1\pm10\%)$, wherein $H_j$ represents the H component value of the first image pixel, and $S_j$ represents the S component value of the first image pixel j.

In one of the exemplary embodiments, when the object is the human face, the non-object pixels are the non-skin pixels, and the object pixel image is the skin pixel image, the step of detecting the glare pixels from the object pixel image according to the saturation distribution threshold and the intensity distribution threshold may be included as follows. The saturation distribution threshold is determined according to parameters of a statistical distribution of the S component values of skin pixels of the skin pixel image. The intensity distribution threshold is determined according to parameters of a statistical distribution of the I component values of the skin pixels of the skin pixel image. The glare pixels whose S component values are less than the saturation distribution threshold and whose I component values are greater than the intensity distribution threshold are identified.

In one of the exemplary embodiments, the S component values and the I component values of the skin pixels both follow a normal distribution, wherein the parameters of the statistical distribution of the S component values of the skin pixels are a mean and a standard deviation of the S component values of the skin pixels, and the parameters of the statistical distribution of the I component values of the skin pixels are a mean and a standard deviation of the I component values of the skin pixels.

In one of the exemplary embodiments, the S value and the I value of each of the glare pixels satisfy Eq.(1) and Eq.(2):

$$S_k<\min((\overline{S}-Z_S\sigma_S),25\%\times C_S) \qquad \text{Eq.(1)}$$

$$I_k>\max((\overline{I}+Z_I\sigma_I),70\%\times C_I) \qquad \text{Eq.(2)},$$

wherein $S_k$ represents the S component value of the skin pixel k within a saturation range $C_S$, $\overline{S}$ represents the mean of the S component value of the skin pixels, $I_k$ represents the I component value of the skin pixel k within an intensity range $C_I$, $\overline{I}$ represents the mean of the I component value of the skin pixels, the saturation range $C_S$ is [0,1], the intensity range $C_I$ is [0,255], and Z is a magnitude of a Z-score value.

The present disclosure is directed to an electronic device for detecting glare pixels of an image including an object. The electronic devices includes at least the elements of a storage medium configured for storing at least one image including the object and a processor coupled to the storage medium and configured for executing the following steps. First, the image is processed to remove overexposed pixels from the image to generate a first image. The first image is processed to remove non-object pixels from the first image to generate an object pixel image. The glare pixels are detected from the object pixel image according to a saturation distribution threshold and an intensity distribution threshold, wherein the saturation distribution threshold and the intensity distribution threshold are dynamically adjustable non-zero integers.

In one of the exemplary embodiments, the processor obtains a RGB pixel value of each image pixel of the image in a Red-Green-Blue (RGB) color space domain, wherein each of the RGB pixel values comprises a R component value, a G component value, and a B component value.

In one of the exemplary embodiments, the processor identifies each of the overexposed pixels from the first image when any pixel of the first image satisfies all of the following conditions: 1) the R component values is greater than a red threshold, 2) the G component values is greater than a green threshold, and 3) the B component values is greater than a blue threshold. The processor further removes the overexposed pixels from the image to generate the first image.

In one of the exemplary embodiments, the processor converts the RGB pixel value of each first image pixel of the first image from the RGB color space domain to a Hue-Saturation-Intensity (HSI) color space domain so as to obtain a corresponding HSI pixel value, wherein each of the HIS pixel values comprises a H component value, a S component value, and a I component value.

In one of the exemplary embodiments, when the object is the human face, the non-object pixels are the non-skin pixels, and the object pixel image is the skin pixel image, the processor identifies each of the non-skin pixels when any pixel of the first image satisfies any of the following conditions: 1) the H component value is less than a lower hue threshold, 2) the H component value is greater than an upper hue threshold, 3) the S component value is less than a lower saturation threshold, and 4) the S component value is greater than an upper saturation threshold. The processor further removes the non-skin pixels from the first image to generate the skin pixel image.

In one of the exemplary embodiments, when the object is the human face, the non-object pixels are the non-skin pixels, and the object pixel image is the skin pixel image, the processor determines the saturation distribution threshold according to parameters of a statistical distribution of the S component values of skin pixels of the skin pixel image, determines the intensity distribution threshold according to parameters of a statistical distribution of the I component values of the skin pixels of the skin pixel image, and further identifies the glare pixels whose S component values are less than the saturation distribution threshold and whose I component values are greater than the intensity distribution threshold.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

No element, act, or instruction used in the description of the present application should be construed as absolutely critical or essential to the present disclosure unless explicitly described as such. Also, as used herein, each of the indefinite articles "a" and "an" is intended to exclude more than one item. If only one item is intended, the terms "a single" or similar languages could be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

Figure 1:
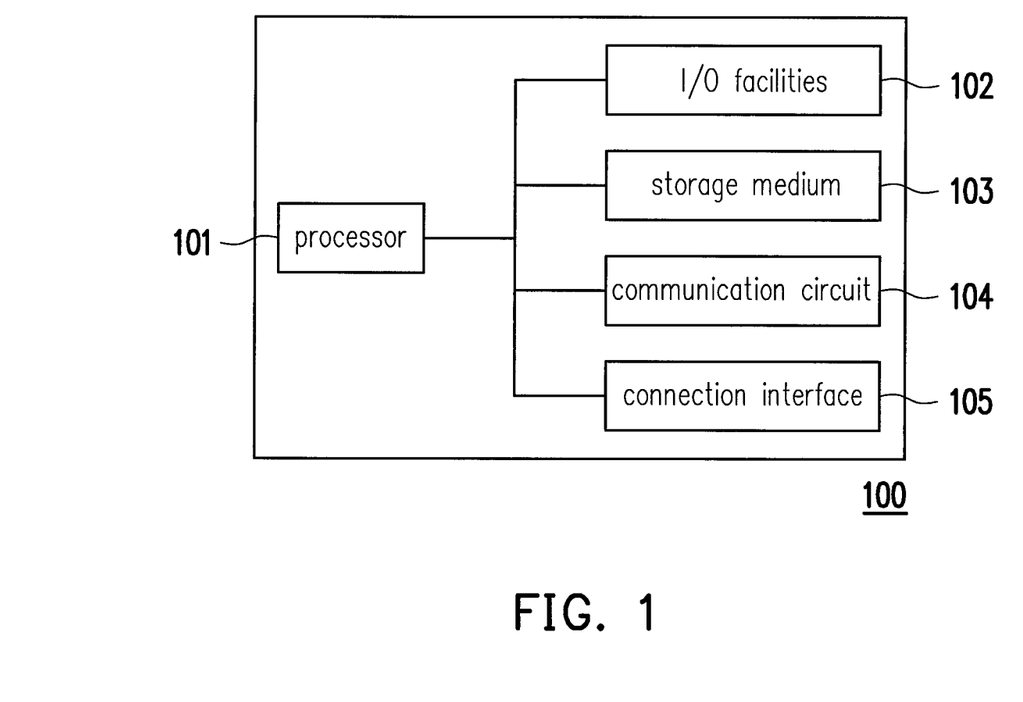
FIG. 1 illustrates a hardware diagram of an exemplary electronic device for implementing the method of the present disclosure.

FIG. 1 illustrates a hardware diagram of an exemplary electronic device for implementing the method of the present disclosure. Referring to FIG. 1, an electronic device 100 may include and/or incorporate an image capture device (not shown) such as a smart phone according to some embodiments of the disclosure; however, the disclosure is not limited thereto. The electronic device 100 may also be a digital camera, a digital video camera, a smart phone, a mobile phone, a personal data analysis (PDA), a desktop computer, a laptop computer, a tabular computer, and so forth.

The electronic device 100 may include a processor 101. The processor 101 may be electrically coupled to at least but not limited to input/output (I/O) facilities 102, a storage medium 103, a communication circuit 104, and a connection interface 105. The processor 101 may include a micro-controller, a North Bridge, a South Bridge, a field programmable array (FPGA), a programmable logic device (PLD), an application specific integrated circuit (ASIC), or other similar device, or a combination thereof. The processor 101 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary electronic device 100. For example, a hybrid CPU/GPU architecture is commonly used.

The I/O facilities 102 may include an interface for a touch screen display, a keyboard, a joystick, a mouse, a pointing device, a speech-based interaction device or the like. The storage medium 103 may be a volatile and non-volatile memory known to those skilled in the art including, for example, a random access memory (RAM), a static random access memory (SRAM), or a dynamic random access memory (RAM). The storage medium 103 may include computer program products such as in the form of programming code, routines, or instruction blocks that provide a specific set or sets of ordered operations that control the functionality of the hardware and direct its operation to perform some features or functionality of the electronic device 100.

The communication circuit 104 may be components which support signal transmissions of a global system for mobile communication (GSM), a personal handy-phone system (PHS), a code division multiple access (CDMA) system, a wireless fidelity (Wi-Fi) system or a worldwide interoperability for microwave access (WiMAX). The communication circuit 104 may also include a wireless transceiver unit 104a to provide wireless access for the portable handheld device.

The connection interface 105 could be, for example, a cable interface such as a universal serial bus (USB) or a wireless interface such as Bluetooth. The connection interface 105 could be a serial interface such as RS232 interface or could be a parallel interface such as USB or Firewire.

When a user take a facial portrait at an event or a social gathering, the user may unavoidably encounter problems with a light-related artifact such as glare on an image. The impacts on the image quality may not be appreciated after the image is taken, especially when the glare is on the facial skin area of the user. Therefore, there needs to be a method and a device to detect glare pixels of such image whereas the probability of successful detection is ensured.

Figure 2:
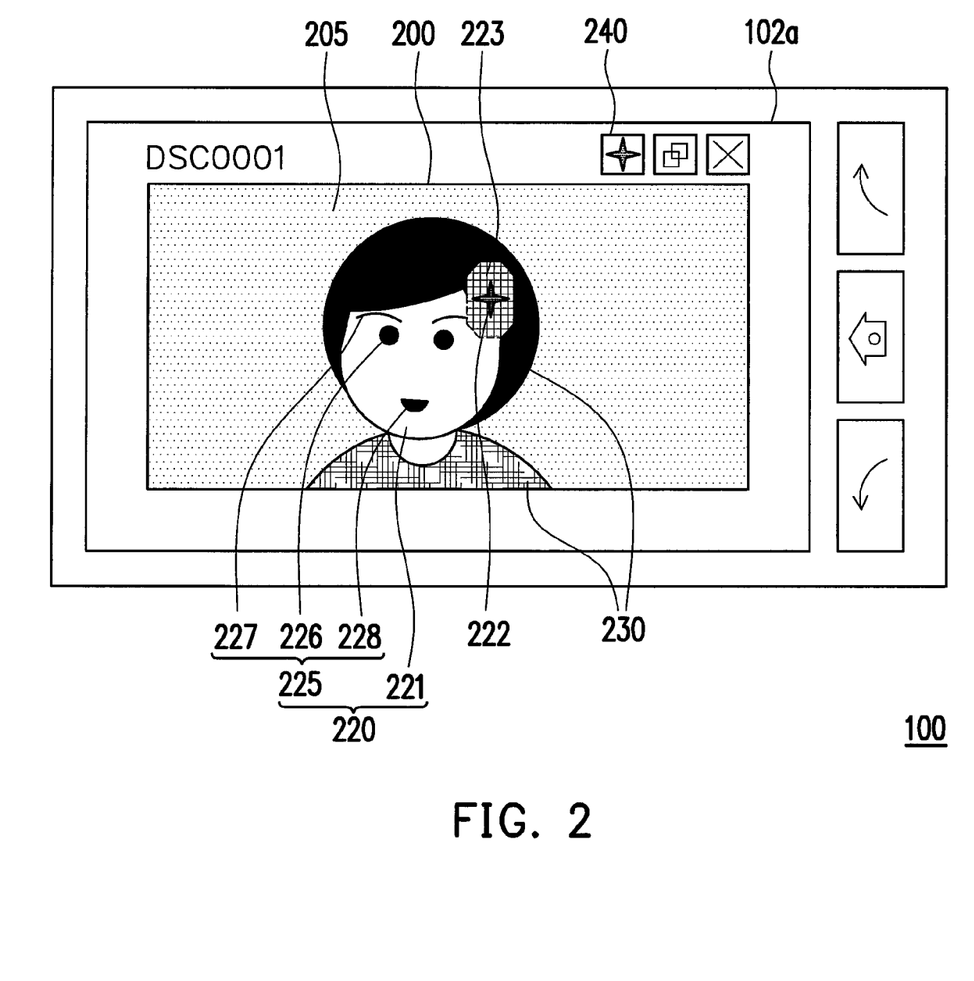
FIG. 2 illustrates a touch screen display of the I/O facilities of the electronic device according to an exemplary embodiment of the present disclosure.

FIG. 2 illustrates a touch screen display 102a of the I/O facilities 102 of the electronic device 100 according to an exemplary embodiment of the present disclosure. Referring to FIG. 2 along with the components in FIG. 1, after a raw image 200 including a human face is taken by the image capturing device, the raw image 200 is stored in the storage medium 103. The raw image 200 may appear on the touch screen display 102a by user selection through the I/O facilities 102. It is noted that the raw image 200 may be obtained from one's laptop computer or desktop computer via the connection interface 105 through a synchronization process or may be user customized. The raw image 200 may also be obtained from an external server via the communication circuit 104. The raw image 200 may be a still picture or a frame of a video clip. The raw image 200 includes a background 205 and a human with a facial area 220 and a non-facial area 230. The facial area 220 includes a skin area 221, eyes 226, eyebrows 227, a mouth 228, wherein the eyes 226, the eyebrows 227, and the mouth 228 altogether are defined as a non-skin area 225. The facial area 220 may further include a glare area 223 and an overexposed area 222, where the overexposed area 222 is included in the glare area 223 in the present embodiment due to ambient lighting conditions. In other exemplary embodiments, the glare area 223 may not include the overexposed area 222.

Figure 3A:
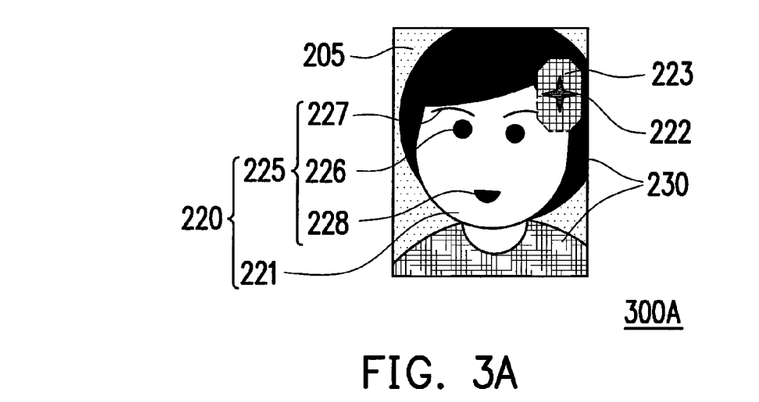
FIG. 3A illustrates an image of a human face in a rectangular shape according to an exemplary embodiment of the present disclosure.

In the present embodiment, while the raw image 200 appears on the screen, a glare detection icon 240 along with other standard icons may appear on the touch screen display 102a. Once the user clicks on the glare detection icon 240, the raw image 200 may be subjected to a glare detection process by first extracting the facial area 220, for example, in a rectangular shape as shown in FIG. 3. In other embodiments, the glare detection process may be performed automatically once the raw image 200 is taken.

FIG. 3A illustrates an image of a human face in a rectangular shape according to an exemplary embodiment of the present disclosure. Referring to FIG. 3A, by leveraging an existing face detection algorithm such as the Viola-Jones algorithm or the Adaboost algorithm which has already been offered by a lot of electronic devices, the processor 101 extracts an image 300A including the facial area 220. Certainly, the facial area 220 also includes the skin area 221, the non-skin area 225, the overexposed area 222, and the glare area 223. Since the image 300A is an approximate position of a detected face image, it may include a small portion of the non-facial area 230 and the background 205. It is noted that, in other embodiments, since there may exist more than one human in the raw image 200, the processor 101 may extract more than one image 300A from the raw image 200. The image 300A may be viewed as an input image of the method and device for detecting glare pixels of the glare area 223 in the present disclosure.

The first step of the method is to process the image 300A to remove overexposed pixels of the overexposed area 222 from the image 300A by the processor 101. Since the image 300A is directly extracted from the raw image 200 without any conversion, the image 300A is in a raw image data format. The processor 101 may convert a raw image data value of each image pixel of the image 300A to a RGB pixel value in a Red-Green-Blue (RGB) color space domain, wherein each of the RGB pixel values includes an R component value, a G component value, and a B component value. The R component values, the G component values, and the B component values range from 0 to 255 in the present embodiment. In other embodiments, each of the R component values, G component values, and B component values may be standardized to a range from 0 to 1.

In photography, an overexposed image refers to a white or a washed-out image. A partially overexposure may result a washed-out image. A complete or a nearly complete overexposure causing a bright area around a white light and fading with distance from a center region may be glare, and all information in affected pixels of the center region may be eliminated. The center region may be referred to as the overexposed area 222 in the present exemplary embodiment, where the overexposed area 222 may appear to be completely white regardless of any contrast and brightness adjustments.

Each of the overexposed pixels is identified when any pixel of the image satisfies all of the following conditions: 1) the R component value is greater than a red threshold, 2) the G component value is greater than a green threshold, and 3) the B component value is greater than a blue threshold. Mathematically speaking, each of the overexposed pixels satisfies all of the following three inequalities: $R_i>244\times(1\pm10\%)$, $G_i>244\times(1\pm10\%)$, and $B_i>231\times(1\pm10\%)$, wherein $R_i$ represents the R component value of the image pixel i, $G_i$ represents the G component value of the image pixel i, and $B_i$ represents the B component value of the image pixel i.

Figure 3B:
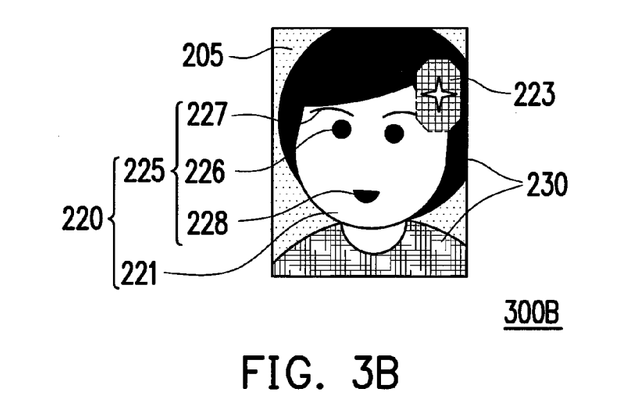
FIG. 3B illustrates a first image according to an exemplary embodiment of the present invention.

After the processor 101 identifies the overexposed pixels, the processor may remove the overexposed pixels from the image 300A to generate a first image 300B as illustrated in FIG. 3B. Referring to FIG. 3B, the first image 300B includes every feature in the image 300A excluding the overexposed area 222. Meanwhile, the processor 101 may process the first image 300B to remove non-skin area 225, non-facial area 230, and the background 205 from the first image 300B.

A Hue-Saturation-Intensity (HSI) color space is commonly used for digital image processing since it is closely related to the way in which the perception of color may be described in an accurate and standardized way. In one of exemplary embodiments, the skin tones from all ethnicities may be described in a Hue-Saturation (HS) plane in the HSI color space domain. The intensity is not taken into consideration for the purpose of isolating the effect from the light. The processor 101 may convert the RGB pixel value of each first image pixel of the first image 300B from the RGB color space domain to the HSI color space domain to obtain a corresponding HIS pixel value, wherein each of the HIS pixel values includes a H component value, a S component value, and a I component value. The H component values range from 0° to 359°. The S component values and I component values may range from 0-255 or may be standardized to a range from 0 to 1.

Next, the processor 101 may need to identify non-skin pixels. It is noted that, the non-skin pixels herein refer to as not only the pixels of the non-skin area 225, but also the pixels of the non-facial area 230 and the background 205. Each of the non-skin pixels is identified when any pixel from the first image 300B satisfies any of the following conditions: 1) the H component values is less than a lower hue threshold, 2) the H component value is greater than an upper hue threshold, 3) the S component value is less than a lower saturation threshold, and 4) the S component value is greater than an upper saturation threshold. According to statistics of a training dataset of human skins, the lower hue threshold, the upper hue threshold, the lower saturation threshold, and the upper saturation threshold are 6, 38, 26, and 218 with ±10% of the values respectively. The training dataset is obtained experimentally by collecting a large amount of human faces with various skin tones from all ethnicities. In some embodiments, the training data representing outliers and other irregularities which skew the results of the threshold determination may be removed from the training dataset. Mathematically speaking, each of the non-skin pixels satisfies any of the following inequalities: $H_j<6\times(1\pm10\%)$, $H_j>38\times(1\pm10\%)$, $S_j<26\times(1\pm10\%)$ and $S_j>218\times(1\pm10\%)$, wherein $H_j$ represents the H component value of the first image pixel, and $S_j$ represents the S component value of the first image pixel j.

Figure 3C:
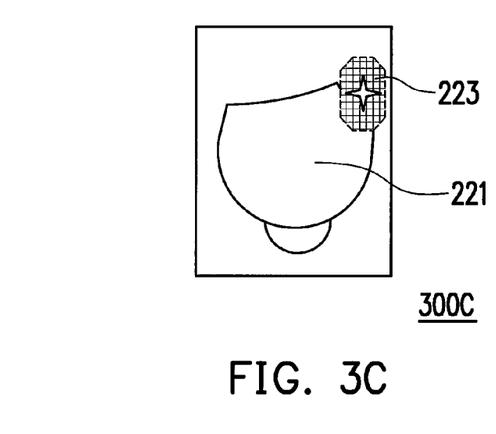
FIG. 3C illustrates a skin pixel image according to an exemplary embodiment of the present disclosure.

After the processor 101 identifies the non-skin pixels the non-skin pixels, the processor 101 may remove the non-skin pixels from the first image 300B to generate a skin pixel image as illustrated in FIG. 3C. Referring to FIG. 3C, the skin pixel image 300C includes the skin area 221 and the glare area 223. Meanwhile, the processor 101 may process the skin pixel image 300C to detect the glare area 223 from the skin pixel image 300C.

In the present exemplary embodiment, the cause of the glare area 223 may be a compound of a contrast effect and a saturation effect. Therefore, the processor 101 may detect glare pixels of the glare area 223 from the skin pixel image 300C according to a saturation distribution threshold and an intensity distribution threshold, wherein the saturation distribution threshold and the intensity distribution threshold are both dynamically adjustable positive values. Since the glare area 223 is an increase in brightness and a reduction in color saturation, the processor 101 may identify the glare pixels whose S component values are less than the saturation distribution threshold and whose I component values are also greater than the intensity distribution threshold. It is noted that, since the overexposed area 222 that may skew the results of the saturation distribution and the saturation distribution have been removed in an earlier stage, the processor 101 may identify the glare area 223 in a more precise manner.

To be more specific, when the skin pixel image 300C is produced, the processor 101 may determine the saturation distribution threshold and the intensity threshold based on statistical distributions of the S component values and the I component values of the skin pixels of the skin pixel image 300C. Since each of the skin pixels are assumed to be independent and identically distributed, without loss of generality, both the S component values and the I component values of the skin pixels are normally distributed according to the Central Limit Theorem (CLT).

In probability theory, the normal distribution (also known as the Gaussian distribution) is a continuous probability distribution. The normal distribution may be characterized by two parameters, a mean and a standard deviation. The mean describes the value about which the distribution is centered, and the standard deviation describes the width of the distribution about the mean. Hence, the processor 101 may set the saturation distribution threshold and the intensity threshold according to the means and the standard deviations of the S component values and the I components values of the skin pixel image 300C along with a predetermined Z-score value, wherein the Z-score value indicates by how many standard deviations a particular value x is above or below the mean. For example, if the Z-score value is equal to 1, the particular value x is equal to the mean plus one standard deviation in the distribution. On the other hand, the normal distribution shows a cumulative probability associated with the Z-score value; that is, the z-score may be used to calculate the percentile of the particular value in the distribution. When the Z-score value is 1, the cumulative probability at the particular value x is approximately 84.1345%. That is, 15.8655% of the values in the distribution is greater than the particular value x. On the other hand, the cumulative probability at another value y is 84.1345%. When the Z-score value is −1, the cumulative probability of the corresponding value y is approximately 15.8655%. That is, 15.8655% of the values in the distribution are less than the particular value y.

The processor 101 may calculate the saturation distribution threshold and the intensity threshold by leveraging the above concept. Mathematically speaking, the S value and the I value of each of the glare pixels satisfy both Eq.(1) and Eq.(2):

$$S_k < \min((\bar{S} - Z\sigma_S), 25\% \times C_S) \quad \text{Eq.(1)}$$

$$I_k > \max((\bar{I} + Z\sigma_I), 70\% \times C_I) \quad \text{Eq.(2)},$$

wherein $S_k$ represents the S component value of the skin pixel k within a saturation range $C_S$, $\bar{S}$ represents the mean of the S component value of the skin pixels, $I_k$ represents the I component value of the skin pixel k within an intensity range $C_I$, $\bar{I}$ represents the mean of the I component value of the skin pixels, the saturation range $C_S$ is [0,255], the intensity range $C_I$ is [0,255], and Z is a magnitude of a Z-score value. In other words, the processor 101 may set the saturation distribution threshold to $\min((\bar{S} - Z\sigma_S), 25\% \times C_S)$ and set the intensity distribution threshold to $\max((\bar{I} + Z\sigma_I), 70\% \times C_I)$. In the present embodiment, it is assumed that Z=1, and Eq(1) and Eq.(2) may be written as Eq.(3) and Eq.(4):

$$S_k < \min((\bar{S} - \sigma_S), 25\% \times C_S) \quad \text{Eq.(3)}$$

$$I_k > \max((\bar{I} + \sigma_I), 170\% \times C_I) \quad \text{Eq.(4)}.$$

The interpretation of Eq.(3) is that the pixel k may be possibly identified as a glare pixel if the corresponding S component value is less than $(\bar{S} - \sigma_S)$. In other words, the lower 15.8655% of the skin pixels corresponding to lower S component values satisfying Eq.(3). The interpretation of the second condition, Eq.(4), is that the pixel k may be possibly identified as a glare pixel if the corresponding I component value is greater than $(\bar{I} + \sigma_I)$. In other words, the higher 15.8655% of the skin pixels corresponding to higher I component values satisfying Eq.(4). Strictly speaking, only the skin pixels with the higher 15.8655 percentiles of the I component values and with the lower 15.8655 percentiles of the S component values are considered as the glare pixels. It is noted that, due to the nature of glare, there may be a lower bound of the saturation of glare and an upper bound of the intensity of glare, which are set to be the 25th percentile of the saturation range and the 70th percentile of the intensity range respectively. For example, in the present embodiment, the saturation range and the intensity range are 0-255, and therefore the lower bound of the saturation of glare is around 63.75 and the upper bound of the intensity of glare is around 178.5. Therefore, the saturation distribution threshold is the minimum between $(\bar{S} - \sigma_S)$ and 63.75. The intensity distribution threshold is the maximum between $(\bar{I} + \sigma_I)$ and 178.5.

Furthermore, the aforementioned glare pixel identification process may not be limited to the normal distribution. In other embodiments, the processor 101 may assume the skin pixels follow other statistical distributions such as the Gaussian mixture distribution, the Gamma distribution, or other customized probability functions. The saturation distribution threshold and the intensity distribution threshold may be determined based on a cumulative distribution function (CDF) of the adapted distribution and parameters thereof.

In another exemplary embodiment, the glare area 223 may suffer a hue shift towards yellow, cyan, or magenta. For example, the human skin tones may turn yellowish when a light is too close to the human. This is because the red component, the dominant color in the human skin tones, is clipped resulting in too much green and blue in proportion. In such case, the processor 101 may also detect glare pixels of the glare area 223 from the skin pixel image 300C according to a hue distribution threshold by leveraging the aforementioned concept. However, due to the nature of the human skin tones, the H component values of the skin pixels fall in the range of 300°-360° and 0°-60°, which are discontinued and separated into two parts of the hue color ring and may be problematic when it comes to the calculation of the mean and the standard deviation. Therefore, in this exemplary embodiment, since the H components values of the skin pixels are aligned at 0° (red), the discontinuity of the H component values of the skin pixels may be resolved by a rotation of 180°. After the rotation, the new H component values of the skin pixels are between 120° and 240°. Next, the processor 101 may continue to calculate the hue distribution threshold by using the new H component values of the skin pixels by leveraging the aforementioned concept. A more detailed process may be referred to the aforementioned embodiments, which may not be repeated herein.

Figure 4:
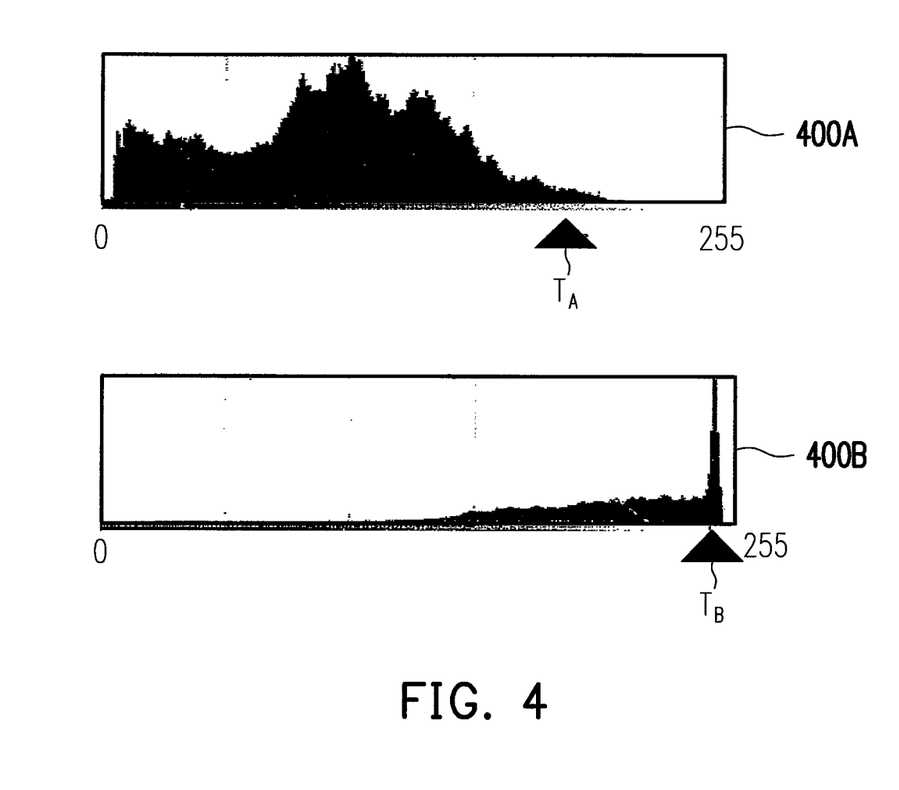
FIG. 4 illustrates a comparison between a distribution histogram of I components values of skin pixels of a darker image and a distribution histogram of I components values of skin pixels of a brighter image according to an embodiment of the present disclosure

The brightness of facial skins on the image is highly dependent on ambient lighting conditions, the present disclosure is able to adjust the saturation distribution threshold and the intensity distribution threshold dynamically and adaptively to satisfy all kinds of condition. As an example, FIG. 4 illustrates a comparison between a distribution histogram 400A of I components values of skin pixels of a darker image and a distribution histogram 400B of I components values of skin pixels of a brighter image according to an embodiment of the present disclosure. Using the same cutoff percentile (i.e. the 84.1345th percentile of the I component value), the intensity distribution threshold $T_A$ of the distribution histogram 400A of the darker image is lower than the intensity distribution threshold T_B of the distribution histogram 400B of the brighter image.

Figure 3D:
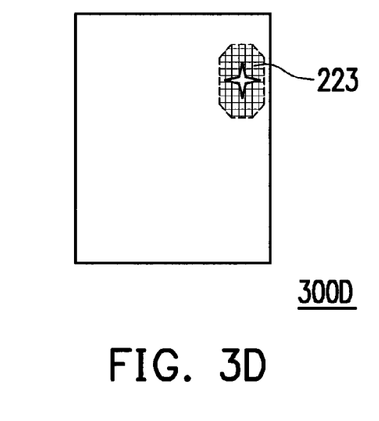
FIG. 3D illustrates a glare pixel image according to an exemplary embodiment of the present disclosure.
Figure 5:
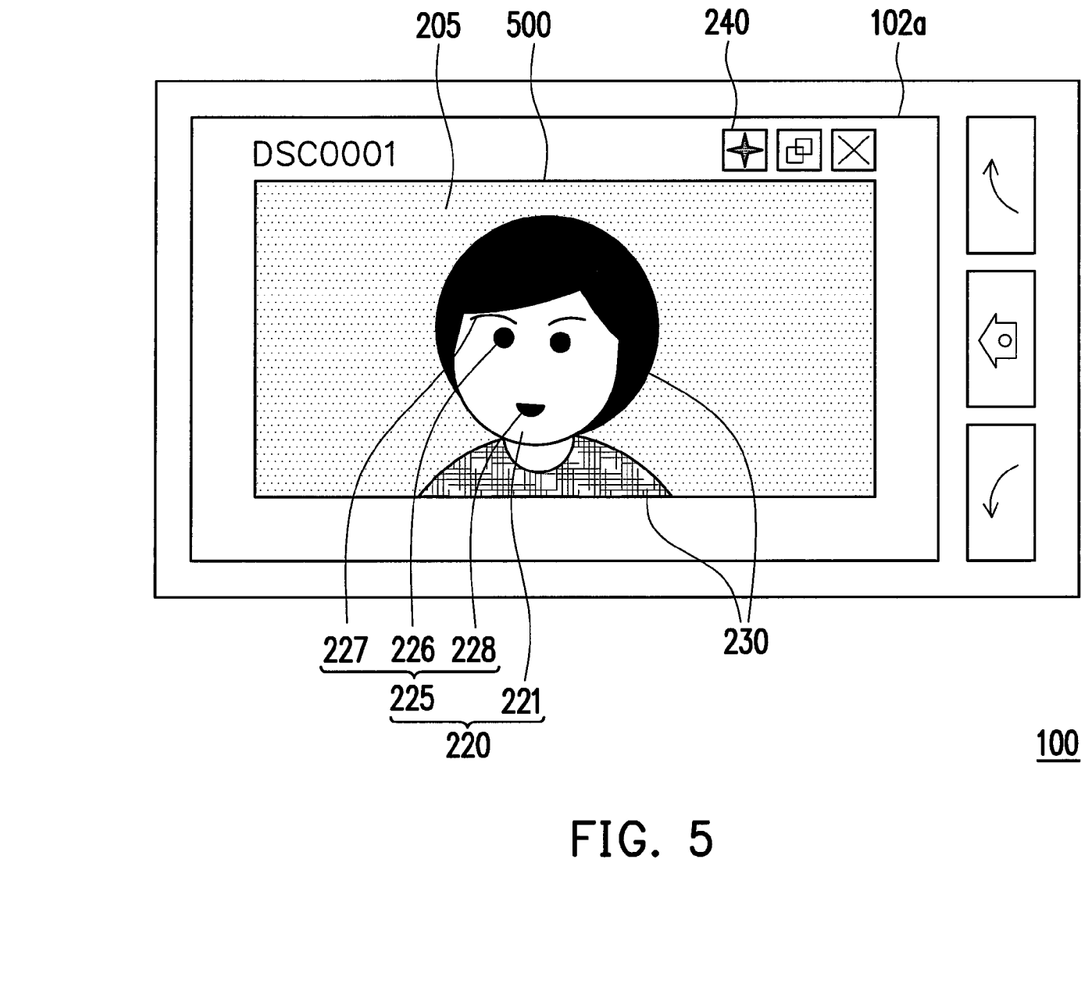
FIG. 5 illustrates the touch screen display of the electronic device according to an exemplary embodiment of the present disclosure.

In one of exemplary embodiments, after the processor 101 identifies the glare pixels, the processor may remove non-glare pixels from the skin pixel image 300C to generate a glare pixel image 300D as illustrated in FIG. 3D. The processor 101 may record corresponding coordinates of the glare pixels in the raw image 200 and remove the glare pixels directly from the raw image 200. The processor 101 may further repair the glare area 223 by adapting some existing image correction techniques with efficient computation. For example, the removed glare pixels may be replaced by pixels with same pixel values as their neighboring non-glare pixels in the skin area 221. After the processor 101 finishes the correcting process, a modified image 500 on the touch screen display 102a of the electronic device 100 is illustrated as FIG. 5.

Figure 6:
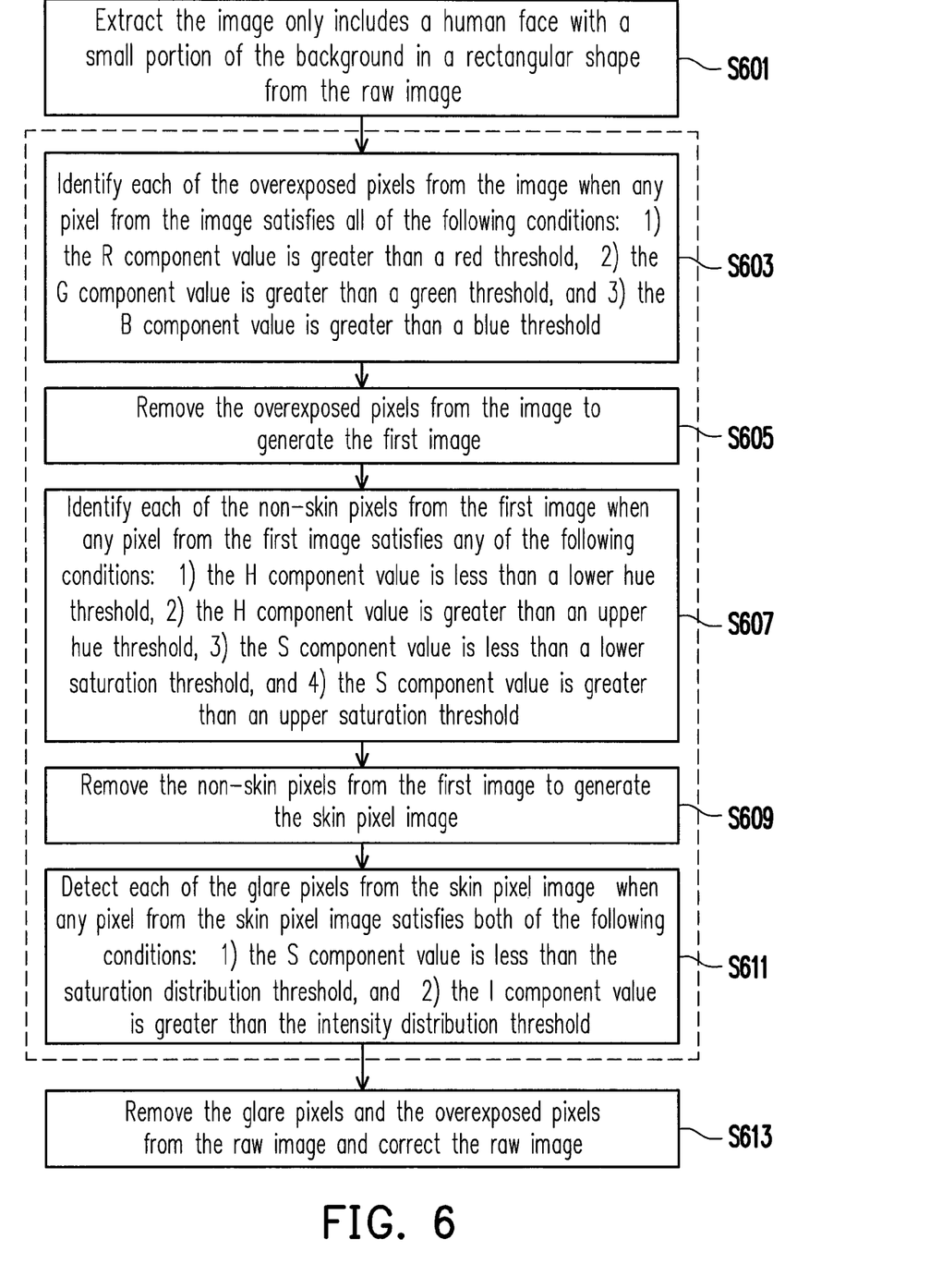
FIG. 6 is a flowchart illustrating the method for detecting glare pixels on an image in the present disclosure.

FIG. 6 is a flowchart summarizing the method for detecting glare pixels on an image in the present disclosure. Referring to FIG. 6 along with the components in the previous embodiments, in Step 601, the image 300A is extracted from the raw image 200 and only includes a human face with a small portion of the background 205 in a rectangular shape. In Step 603, each of the overexposed pixels is identified from the image 300A when any pixel from the first image 300A satisfies all of the following conditions: 1) the R component value is greater than a red threshold, 2) the G component value is greater than a green threshold, and 3) the B component value is greater than a blue threshold. In Step S605, the overexposed pixels are removed from the image 300A to generate the first image 300B. In Step S607, each of the non-skin pixels is identified from the first image 300B when any pixel from the first image 300B satisfies any of the following conditions: 1) the H component value is less than a lower hue threshold, 2) the H component value is greater than an upper hue threshold, 3) the S component value is less than a lower saturation threshold, and 4) the S component value is greater than an upper saturation threshold. In Step S609, the non-skin pixels are removed from the first image 300B to generate the skin pixel image 300C. In Step S611, each of the glare pixels is detected from the skin pixel image 300C when any pixel from the skin pixel image 300C satisfies both of the following conditions: 1) the S component value is less than the saturation distribution threshold, and 2) the I component value is greater than the intensity distribution threshold. The saturation distribution threshold and the intensity distribution threshold are dynamically adjustable according to the raw image 200. That is, different raw images may result in different saturation distribution thresholds and intensity distribution thresholds. In Step S613, the glare pixels as well as the overexposed pixels are removed from the raw image 200 and the raw image 200 are corrected.

It should be noted that, the method and the device for detecting glare pixels illustrated above are not limited to be applied to human faces. In other exemplary embodiments, the method and the device may be extended to any object by leveraging the same algorithm. Once an image including the object is taken, the processor 101 may remove overexposed pixels from the image to generate a first image. Next, the processor 101 may process the first image to remove non-object pixels from the first image to generate an object pixel image. That is, the H component value and the S component value of each of the pixels in the first image are compared to a lower hue threshold, an upper hue threshold, a lower saturation threshold, and an upper saturation threshold according to statistics of a training dataset of the same kind of objects. Lastly, the processor 101 may detect the glare pixels from the object pixel image according to a saturation distribution threshold and an intensity distribution threshold. A more detailed process may be referred to the aforementioned exemplary embodiment.

In one of exemplary embodiments, computer program products including a plurality of program instructions stored in a tangible computer medium implementing the method of this disclosure will commonly be non-volatile, hard-coded type media distributed to users on a distribution medium, such as floppy disks, read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links, or other computer-readable medium. The term "computer-readable medium" encompasses distribution media, intermediate storage media, execution memory of a computer, and any other medium or device capable of storing computer program instructions implementing the functionality or methods of embodiments of the present disclosure for later reading by a computer system. The computer program will often be copied from the computer-readable medium to a hard disk or a similar intermediate storage medium. When the programs are to be run, they will be loaded either from their distribution medium or their intermediate storage medium into the execution memory of the computer, configuring the computer to act in accordance with the algorithm or method of this invention. All such operations are well known to those skilled in the art of computer systems.

In view of the aforementioned descriptions, the method and the device provided in the present disclosure is able to classify an artifact caused by glare on a facial portrait image based on a saturation distribution threshold and an intensity distribution threshold. Since the brightness of facial skins on the image is highly dependent on ambient lighting conditions and there exists various skin tones from all ethnicities, the present disclosure is able to adjust the saturation distribution threshold and the intensity distribution threshold dynamically and adaptively to satisfy all kinds of users and conditions so as to improve the probability of successful detection and reduce the probability of false alarm on the artifact. The method and the device provided in the present disclosure may be extended to any object in a similar fashion. Moreover, the method in the present disclosure does not require complicated arithmetic algorithms, it is particularly suitable for electronic devices with limited computational resources.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method for detecting glare pixels of an image comprising an object, adapted for an electronic device, comprising:

processing the image to remove overexposed pixels from the image to generate a first image;

processing the first image to remove non-object pixels from the first image to generate an object pixel image; and detecting the glare pixels from the object pixel image according to a saturation distribution threshold and an intensity distribution threshold, wherein the saturation distribution threshold and the intensity distribution threshold are dynamically adjustable non-zero integers in a Hue-Saturation-Intensity (HSI) color space domain, wherein each pixel in the object pixel image comprises a corresponding HSI pixel value in the HSI color space domain, each of the HSI pixel values comprises a H component value, a S component value, and an I component value, wherein the saturation distribution threshold is determined according to a statistical distribution of the S component values of the pixels in the object pixel image, and wherein the intensity distribution threshold is determined according to a statistical distribution of the I component values of the pixels in the object pixel image.

2. The method according to claim 1, wherein before said step of processing the image to remove the overexposed pixels from the image to generate the first image, the method further comprises:

obtaining a RGB pixel value of each image pixel of the image in a Red-Green-Blue (RGB) color space domain, wherein each of the RGB pixel values comprises an R component value, a G component value, and a B component value.

3. The method according to claim 1, wherein said step of processing the image to remove the overexposed pixels from the image to generate the first image comprises:

identifying each of the overexposed pixels from the image when any pixel of the image satisfies all of the following conditions: 1) an R component value is greater than a red threshold, 2) a G component value is greater than a green threshold, and 3) a B component value is greater than a blue threshold; and removing the overexposed pixels from the image to generate the first image.

4. The method according to claim 3, each of the overexposed pixels satisfies all of the following inequalites: $R_i>244\times(1\pm10\%)$, $G_i>244\times(1\pm10\%)$, and $B_i>231\times(1\pm10\%)$, wherein $R_i$, represents the R component value of the image pixel i, $G_i$ represents the G component value of the image pixel i, and $B_i$ represents the B component value of the image pixel i.

5. The method according to claim 3, wherein before said step of processing the first image to remove the non-object pixels from the first image to generate the object pixel image, the method further comprises:

converting the RGB pixel value of each first image pixel of the first image from the RGB color space domain to the HSI color space domain to obtain a corresponding HSI pixel value.

6. The method according to claim 5, wherein when the object is a human face, the non-object pixels are non-skin pixels, and the object pixel image is a skin pixel image, said step of processing the first image to remove the non-object pixels from the first image to generate the object pixel image comprises:

identifying each of the non-skin pixels from the first image when any pixel from the first image satisfies any of the following conditions: 1) the H component value is less than a lower hue threshold, 2) the H component value is greater than an upper hue threshold, 3) the S component value is less than a lower saturation threshold, and 4) the S component value is greater than an upper saturation threshold; and removing the non-skin pixels from the first image to generate the skin pixel image.

7. The method according to claim 6, wherein each of the non-skin pixels satisfies any of the following inequalities: $H_j<6\times(1\pm10\%)$, $H_j>38\times(1\pm10\%)$, $S_j<26\times(1\pm10\%)$ and $S_j>218\times(1\pm10\%)$, wherein $H_j$ represents the H component value of the first image pixel, and $S_j$ represents the S component value of the first image pixel j.

8. The method according to claim 6, wherein when the object is the human face, the non-object pixels are the non-skin pixels, and the object pixel image is the skin pixel image, said step of detecting the glare pixels from the object pixel image according to the saturation distribution threshold and the intensity distribution threshold comprises:

determining the saturation distribution threshold according to parameters of a statistical distribution of the S component values of skin pixels of the skin pixel image;

determining the intensity distribution threshold according to parameters of a statistical distribution of the I component values of the skin pixels of the skin pixel image; and identifying each of the glare pixels from the skin pixel image when any pixel from the skin pixel image satisfies both of the following conditions: 1) the S component value is less than the saturation distribution threshold, and 2) the I component value is greater than the intensity distribution threshold.

9. The method according to claim 8, wherein the S component values and the I component values of the skin pixels both follow a normal distribution, wherein the parameters of the statistical distribution of the S component values of the skin pixels are a mean and a standard deviation of the S component values of the skin pixels, and the parameters of the statistical distribution of the I component values of the skin pixels are a mean and a standard deviation of the I component values of the skin pixels.

10. The method according to claim 9, wherein the S value and the I value of each of the glare pixels satisfy Eq.(1) and Eq.(2):

$$S_k<\min((\overline{S}-Z_S\sigma_S),25\%\times C_S) \qquad \text{Eq.(1)}$$

$$I_k>\max((\overline{I}+Z_I\sigma_I),70\%\times C_I) \qquad \text{Eq.(2),}$$

wherein $S_k$ represents the S component value of the skin pixel k within a saturation range $C_s$, $\overline{S}$ represents the mean of the S component value of the skin pixels, $I_k$ represents the I component value of the skin pixel k within a intensity range $C_I$, $\overline{I}$ represents the mean of the I component value of the skin pixels, the saturation range $C_S$ is [0,1], the intensity range $C_I$ is [0,255], and Z is a magnitude of a Z-score value.

11. An electronic device comprising:

a storage medium configured for storing at least one image comprising an object;

a processor coupled to the storage medium and configured for:

processing the image to remove overexposed pixels from the image to generate a first image;

processing the first image to remove non-object pixels from the first image to generate an object pixel image; and detecting the glare pixels from the object pixel image according to a saturation distribution threshold and an intensity distribution threshold, wherein the saturation distribution threshold and the intensity distribution threshold are dynamically adjustable non-zero integers in a Hue-Saturation-Intensity (HSI) color space domain, wherein each pixel in the object pixel image comprises a corresponding HSI pixel value in the HSI color space domain, each of the HSI pixel values comprises a H component value, a S component value, and an I component value, wherein the saturation distribution threshold is determined according to a statistical distribution of the S component values of the pixels in the object pixel image, and wherein the intensity distribution threshold is determined according to a statistical distribution of the I component values of the pixels in the object pixel image.

12. The electronic device according to claim 1, wherein before the processor is configured for processing the image to remove the overexposed pixels from the image to generate the first image, the processor is further configured for:

obtaining a RGB pixel value of each image pixel of the image in a Red-Green-Blue (RGB) color space domain, wherein each of the RGB pixel values comprises a R component value, a G component value, and a B component value.

13. The electronic device according to claim 11, wherein the processor is configured for processing the image to remove the overexposed pixels from the image to generate the first image comprising:

identifying each of the overexposed pixels from the image when any pixel of the image satisfies all of the following conditions: 1) an R component value is greater than a red threshold, 2) a G component value is greater than a green threshold, and 3) a B component value is greater than a blue threshold; and removing the overexposed pixels from the image to generate the first image.

14. The electronic device according to claim 13, wherein each of the overexposed pixels satisfies all of the following inequalites: $R_i \geq 244 \times (1 \pm 10\%)$, $G_i > 244 \times (1 \pm 10\%)$, and $B_i > 231 \times (1 \pm 10\%)$, wherein $R_i$ represents the R component value of the image pixel i, $G_i$ represents the G component value of the image pixel i, and $B_i$ represents the B component value of the image pixel i.

15. The electronic device according to claim 13, wherein before the processor is configured for processing the first image to remove the non-object pixels from the first image to generate the object pixel image, the processor is configured for:

converting the RGB pixel value of each first image pixel of the first image from the RGB color space domain to the HSI color space domain to obtain a corresponding HSI pixel value.

16. The electronic device according to claim 15, wherein when the object is a human face, the non-object pixels are non-skin pixels, and the object pixel image is a skin pixel image, the processor is configured for processing the first image to remove the non-object pixels from the first image to generate the object pixel image comprising:

identifying each of the non-skin pixels from the first image when any pixel of the first image satisfies any of the following conditions: 1) the H component value is less than a lower hue threshold, 2) the H component values is greater than an upper hue threshold, 3) the S component value is less than a lower saturation threshold, and 4) the S component value is greater than an upper saturation threshold; and removing the non-skin pixels from the first image to generate the skin pixel image.

17. The electronic device according to claim 16, wherein each of the non-skin pixels satisfies any of the following inequalities: $H_j < 6 \times (1 \pm 10\%)$, $H_j > 38 \times (1 \pm 10\%)$, $S_j < 26 \times (1 \pm 10\%)$ and $S_j > 218 \times (1 \pm 10\%)$, wherein $H_j$ represents the H component value of the first image pixel, and $S_j$ represents the S component value of the first image pixel j.

18. The electronic device according to claim 16, wherein when the object is the human face, the non-object pixels are the non-skin pixels, and the object pixel image is the skin pixel image, the processor is configured for detecting the glare pixels from the object pixel image according to the saturation distribution threshold and the intensity distribution threshold comprising:

determining the saturation distribution threshold according to parameters of a statistical distribution of the S component values of skin pixels of the skin pixel image;

determining the intensity distribution threshold according to parameters of a statistical distribution of the I component values of the skin pixels of the skin pixel image; and identifying each of the glare pixels from the skin pixel image when any pixel of the skin pixel image satisfies both of the following conditions: 1) the S component value is less than the saturation distribution threshold, and 2) the I component values is greater than the intensity distribution threshold.

19. The electronic device according to claim 8, wherein the S component values and the I component values of the skin pixels both follow a normal distribution, wherein the parameters of the statistical distribution of the S component values of the skin pixels are a mean and a standard deviation of the S component values of the skin pixels, and the parameters of the statistical distribution of the I component values of the skin pixels are a mean and a standard deviation of the I component values of the skin pixels.

20. The electronic device according to claim 19, wherein the S value and the I value of each of the glare pixels satisfy Eq.(1) and Eq.(2):

$$S_k \leq \min((\overline{S} - Z\sigma_S), 25\% \times C_S) \qquad \text{Eq.(1)}$$

$$I_k > \max((\overline{I} + Z\sigma_I), 70\% \times C_I) \qquad \text{Eq.(2)},$$

wherein $S_k$ represents the S component value of the skin pixel k within a saturation range $C_S$, $\overline{S}$ represents the mean of the S component value of the skin pixels, $I_k$ represents the I component value of the skin pixel k within an intensity range $C_I$, $\overline{I}$ represents the mean of the I component value of the skin pixels, the saturation range $C_S$ is [0,1], the intensity range $C_I$ is [0,255], and Z is a magnitude of a Z-score value.

* * * * *